United States Patent [19]

Licht

[11] 4,295,689
[45] Oct. 20, 1981

[54] ADJUSTABLE CLEARANCE FOIL JOURNAL BEARING AND METHOD OF MANUFACTURING FOIL ELEMENT THEREFOR

[75] Inventor: Lazar Licht, San Mateo, Calif.

[73] Assignee: United Technologies Corporation, Hartford, Conn.

[21] Appl. No.: 71,508

[22] Filed: Aug. 30, 1979

[51] Int. Cl.³ .............................................. F16C 32/06
[52] U.S. Cl. .......................................... 308/9; 308/26; 308/121
[58] Field of Search ....................... 308/9, 26, 73, 121, 308/160, DIG. 1

[56] References Cited

U.S. PATENT DOCUMENTS

| 4,097,094 | 6/1978 | Gardner | 308/9 |
| 4,133,585 | 1/1979 | Licht | 308/9 |

FOREIGN PATENT DOCUMENTS 296132  8/1928  United Kingdom ................. 308/26

*Primary Examiner*—Frederick R. Schmidt
*Attorney, Agent, or Firm*—John D. Del Ponti; John Swiatocha

[57] ABSTRACT

A fluid-film journal bearing includes a resilient foil insert assembly mounted in the bore of a retaining member and having a bearing surface cooperative with the bearing surface of a rotatable journal. The retaining member has a slit extending tangential to the bore with associated means for retaining the foil and for varying the bearing clearance. The resilient foil insert comprises a continuous length of foil coiled into a plurality of layers with the innermost layer providing said bearing surface and another layer preformed into successive, undulating curves having alternating peaks and valleys.

A method for fabricating the foil insert includes the use of a pair of cooperating toothed rolls to deform a portion of the foil insert into the aforesaid undulations.

13 Claims, 14 Drawing Figures

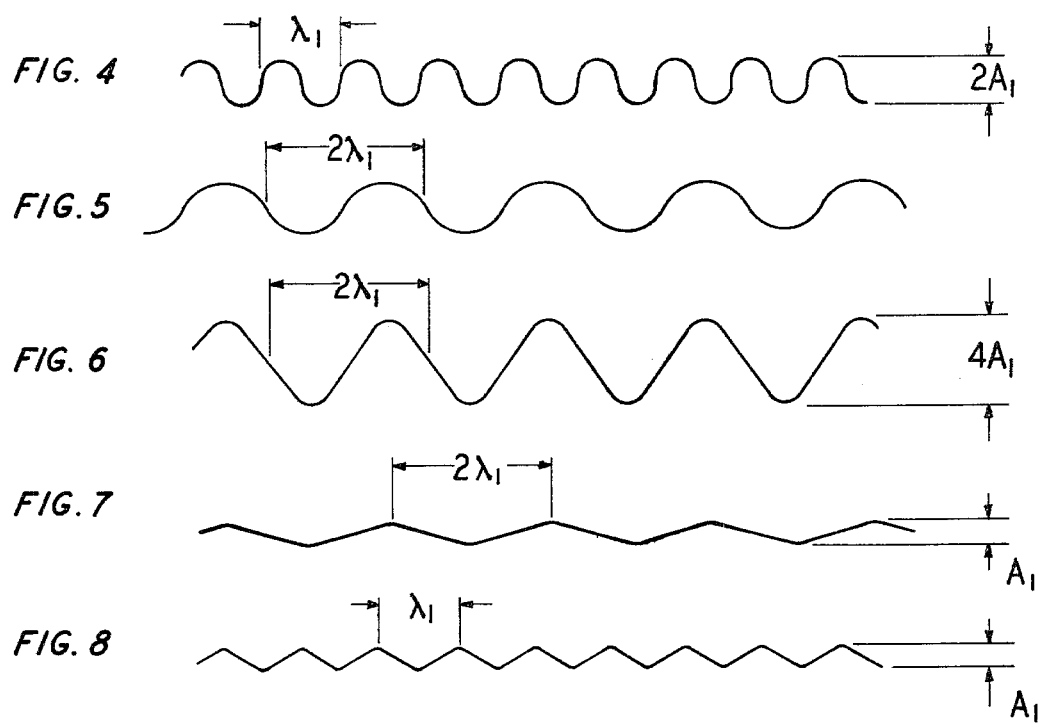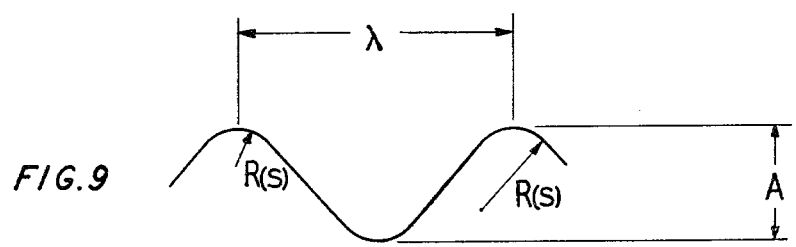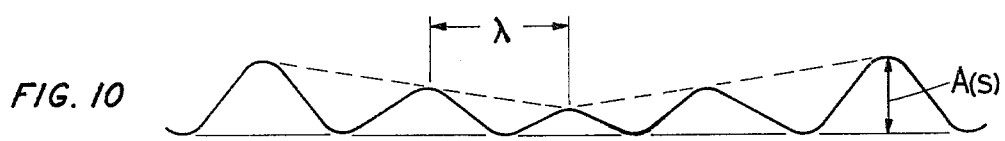

ADJUSTABLE CLEARANCE FOIL JOURNAL BEARING AND METHOD OF MANUFACTURING FOIL ELEMENT THEREFOR

BACKGROUND OF THE INVENTION

This invention relates to fluid-film bearings for rotating machinery and more particularly to adjustable clearance journal bearings for efficient support of high speed rotors, which include resilient bearing-inserts as well as a method for fabricating the resilient inserts.

Rigid and rigidly-mounted fluid-film bearings are limited in regard to rotor speed and mass and are prone to cause the motion of the rotor to become unstable due to self-excited whirl. The instability and associated growth of rotor excursions results in vibrations which frequently lead to damage and destruction of these bearings and of the machinery associated therewith. Furthermore, such bearings are not tolerant of misalignment, thermal distortion or foreign particles. These shortcomings are particularly pronounced in gas-lubricated bearings, which also lack the greater damping and boundary lubrication provided by the more viscous liquid lubricants.

Methods of increasing the stable operating range of rigid gas bearings have been the subject of numerous investigations and publications in the literature. Partial flexibility, and with it improved stability and self-aligning characteristics, can be provided by pivoted-shoe bearings, but these are generally complex, expensive and tend to introduce other problems, such as pivot fretting and wear, shoe flutter and other dynamic problems. Furthermore they are difficult to install and generally require the spring loading of a shoe, if stability is to be insured.

Considerable progress in overcoming the above shortcomings has been achieved through the introduction of flexible-element bearings, known as "foil bearings". Journal bearings of this type are shown in various U.S. Patents. Trumpler No. 1,595,744; Marley No. 3,382,014; Barnett No. 3,677,612 and Licht No. 3,795,427, for example, show bearings which utilize overlapping, flexible foils or reeds disposed about the journal. Falk et al No. 2,703,735; Marley No. 3,434,761; Licht No. 3,520,578 and British Pat. No. 296,132 to Gray illustrate journal bearings which utilize one or more tensioned bands or foils disposed about the journal.

Cherubim U.S. Pat. No. 3,809,443 shows two foil elements welded together, one as a backing with circular arches convex toward the journal and the other as a plain foil element supported on the crests of the arches. The flexibility of such arches is limited and the inherent damping is frequently insufficient to suppress instability, since lateral motion (rubbing) between foil members is constrained. The method of joining poses additional problems.

Licht U.S. Pat. No. 4,133,585, incorporated herein by reference, describes a single foil element in which a polygonally bent backing with radiused vertices forms a resilient support and is integral with the plain section of the foil. The backing and the plain section are coiled and retained in a simple manner in the bearing shell.

Although prior art foil bearings have proven useful, the need for further improvements has remained. There is an unquestioned need for improved resilient, gas or liquid lubricated journal bearings for high-speed rotors in numerous applications, such as turbocompressors, turbochargers, turbogenerators, turbine gas generators, aircraft cabin air-conditioning units, cryotenic expanders and gas liquefaction machines, rotating-mirror scanners, blowers, pumps, centrifuges, yarn processors and spinners and the like.

SUMMARY OF THE INVENTION

It is a general object of the present invention to provide an improved fluid-film and resilient journal bearing which can remedy the deficiencies of the prior art. It is a more specific object of the present invention to provide a hydrodynamic journal bearing which is (a) stable and not limited operationally by self-excited whirl instability, (b) capable of operation at high temperatures and in the presence of steep thermal gradients, (c) tolerant of contamination and abrasive particles, (d) able to accommodate misalignment, manufacturing inaccuracies and differential expansion of bearing components, (e) endowed with good wipe-wear, inherent flexibility and damping characteristics, and (f) provided with means for in situ adjustment of clearance.

It is another specific object of the present invention to provide, for the foregoing bearing, a method and apparatus for the fabrication of a foil element having a flexible spring-backing in the form of a wave which (a) is precise, (b) can be rapidly set and adjusted, (c) permits an almost infinite variation of wavelength, amplitude and local curvature of the resilient backing, thereby allowing a corresponding variation of stiffness and, indirectly, damping properties of the foil elements, and (d) lends itself to inexpensive, rapid and continuous fabrication.

The present invention contemplates a novel and improved journal bearing comprising a stationary retaining member having a bore and a slit, the slit being disposed tangential to the bore and extending through the wall of the retaining member, a rotatable shaft in the bore and a resilient bearing foil strip having a plurality of turns coiled within the bore about the shaft, the foil strip having a fixed end in the slit secured to the retaining member and a free end adjacent the shaft, one of the turns of the foil strip being corrugated to provide resilient support, and means on the retaining member for adjusting the size of the bore to vary the clearance between the shaft and the foil strip. In the present invention, the tangential slit serves to provide both adjustability of bearing clearance and positive retention of the foil element. The foil element is a resilient and continuous length of foil having a portion thereof initially preformed to a wave or undulated shape, the wavelength, amplitude and local curvature of which is preselected to control stiffness and, indirectly, the damping characteristics of the bearing.

A simple and unique method and apparatus for fabricating the foil element to preselect the parameters of the undulated portion thereof includes the use of a pair of toothed rolls or spur gears, with one roll having a fixed axis of rotation and the other having a resiliently biased, translatable axis of rotation. The gear pitch, which may be variable, the tooth form and the spring force applied determine the wavelength, the amplitude and the local curvature of the resilient-foil backing portion.

BRIEF DESCRIPTION OF THE DRAWINGS

An understanding of the invention will become more apparent to those skilled in the art by reference to the following detailed description when viewed in light of the accompanying drawings wherein:

FIGS. 4-10 are end views of the periodic wave portion of the foil;

DESCRIPTION OF THE PREFERRED EMBODIMENTS

Figure 1:
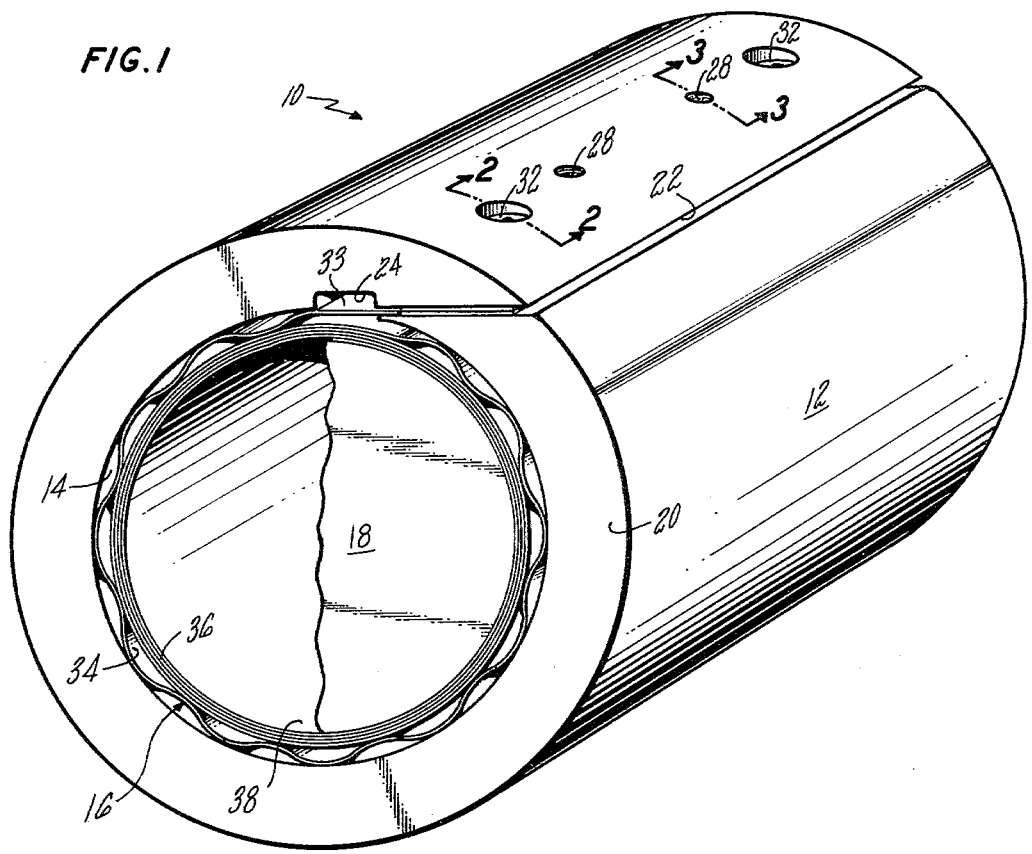
FIG. 1 is a perspective view of a journal bearing incorporating the present invention.
Figure 2:
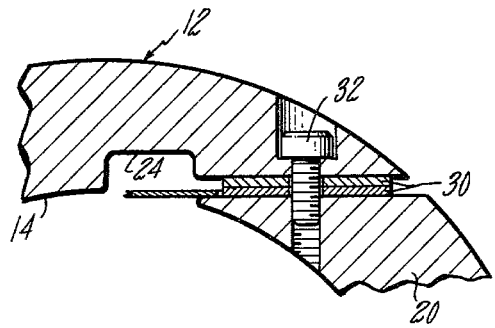
FIG. 2 is an enlarged partial sectional view of a portion of the bearing as taken along section 2—2 of FIG. 1.
Figure 3:
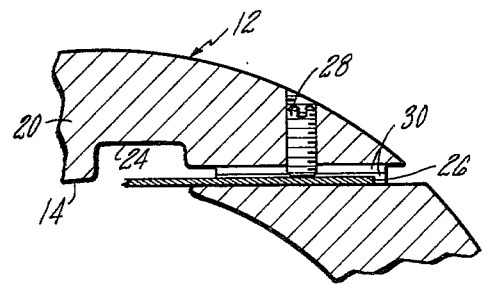
FIG. 3 is an enlarged partial sectional view of a portion of the bearing taken along section 3—3 of FIG. 1.

Referring now to the drawings wherein like numerals indicate like parts, a resilient foil journal bearing 10 includes a cylindrical shell or retainer 12 having a bore 14 and, disposed in the bore, a coiled foil element 16 and a journal 18. The wall 20 of the shell 12 is cleaved by a slit 22 which extends tangential to the bore for the entire length of the shell. Adjacent the conjunction of the slit 22 and the bore 14, there is located in the wall 20 a longitudinal relief groove 24. The outer end 26 of foil 16 is of a narrowed width which is secured in the slit 22 by means of a pair of locking screws 28.

The height of the slit and hence, the size of the bore and the bearing clearance, is adjustable by means of spacing shims 30 in the slit 22 and adjusting screws 32. It will be appreciated, for example, that if it is desired to decrease clearance, a relatively thin spacing shim 30 may be clamped in the slit together with the foil element end 26. Conversely, a thicker spacing shim may be inserted in the slit to increase clearance. Although the foregoing adjustments may result in some deviation from circularity, those skilled in the art will recognize that this deviation is of second-order magnitude in comparison with the mean clearance and the ovality due to elastic deflections of the foil element.

Attention is drawn to the fact that the height of the slit 22 may be made non-uniform along its length, such as by utilizing a greater thickness of shims 30 at one end of the retainer 12 than at its other end. In this way, it is possible to provide a taper (conicity) to the bore and to the coiled foil element 16 in order to compensate for differential thermal expansion of the journal 18 and retainer 12 along the bearing axis during operation, as for example when the bearing is adjacent to a turbine wheel which operates at elevated temperatures.

The foil element 16 is coiled within the annular space between the retainer 12 and the journal 18 and is comprised of three integral sections or portions: an outermost plain portion 33, an intermediate undulated or wave portion 34 and a plain inner portion 36. The outermost plain portion 33 has its free end 26 secured in the slit 22 as hereinbefore described. The portion 33 may be of short length, extending for less than one full turn as shown in FIG. 1, or it may be longer, extending for one or more turns. The wave or corrugated portion 34 is formed in the shape of successive, undulating curves having alternating peaks and valleys and functions as a resilient backing for the plain portion 36 with the innermost turn of the plain portion presenting a bearing surface 38 to the journal 18. The resilient backing 34 is typically of a length sufficient to extend a full turn as shown and is also preferably in the shape of a periodic wave, several forms of which are illustrated in FIGS. 4-10, although it may also be in the shape of an aperiodic wave. It is possible to fabricate an almost infinite variety of forms for wave portion 34 by changing the wavelength $\lambda$, the peak-to-peak amplitude A and/or the local radius of curvature $R_{(s)}$, where s is the distance along the undulation. In doing so, one can vary implicitly the stiffness of the resilient backing 34 and also the damping, which in turn depends on the frictional dissipation of energy due to tangential motion of the backing relative to adjacent foil and shell surfaces. Furthermore it is possible to vary the amplitude of the undulation as illustrated in FIG. 10, thus varying the local bearing characteristics along its circumference.

The coiled layers of the foil element 16 shown in FIG. 1 have a smoothing effect on periodic clearance undulations, while rubbing and squeezing the fluid in the interstitial clearances of adjacent layers provides additional damping.

Figure 11:
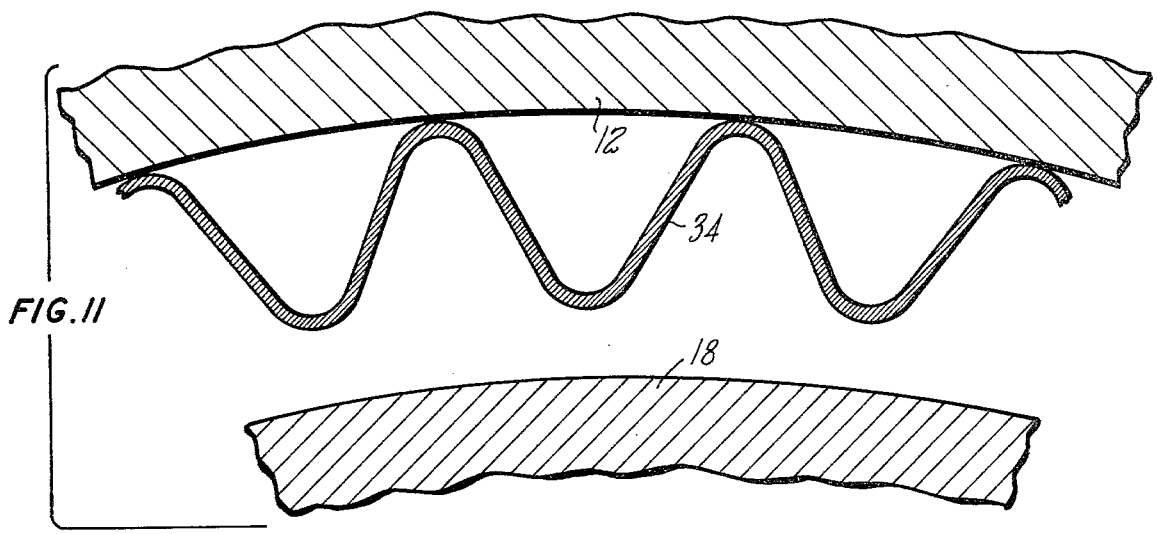
FIGS. 11-13 are enlarged partial sectional views of the bearing.
Figure 12:
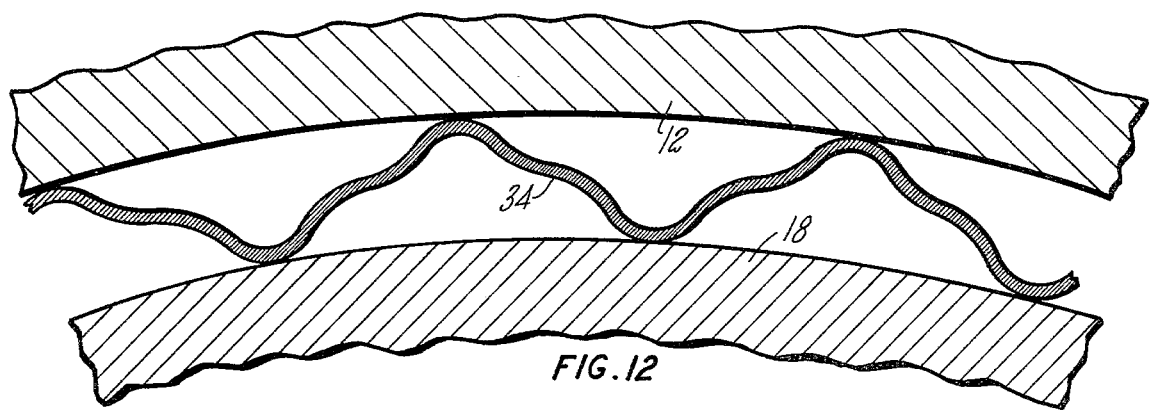
Figure 13:
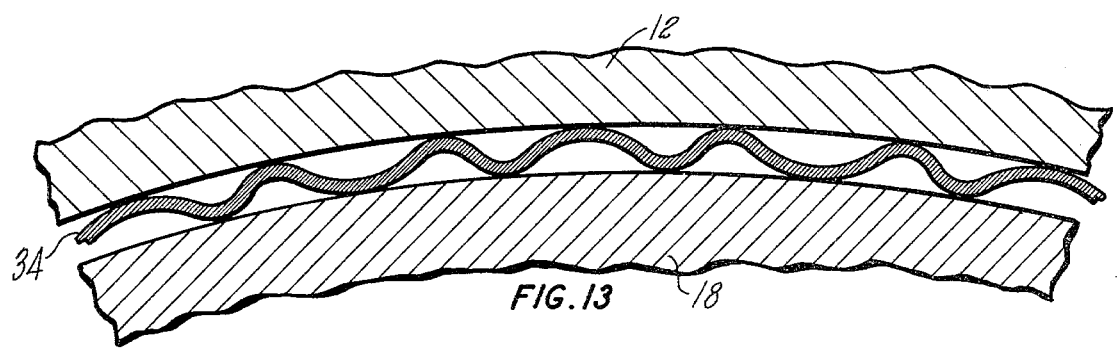

The manner in which a typical corrugated backing may deflect in the region of minimum clearance of an eccentric journal is illustrated schematically in FIGS. 11-13, in which the foil thickness and amplitude of the corrugations are grossly exaggerated, and in which the layers of the plain portions 33 and 36 of foil 16 are omitted for clarity. In FIG. 11, the journal is concentric and the initial undulation 34 is undeformed. With the approach of the journal 18, as in FIG. 12, the vertices of the wave spread and increase the radii of curvature, while the inflections between vertices become more pronounced through bending. The vertices also recede from one another and the dissipation of energy through sliding friction accounts largely for damping. Depending upon foil thickness, wave amplitude and wavelength, secondary vertices may form between the initial wave crests and contact the adjacent surfaces, as indicated in FIG. 13.

In general, the foil element 16 has a highly nonlinear spring characteristic and large journal excursions are resisted with increasing force. The deflection of the backing results in lateral, relative motion and sliding friction between foil layers and between foil and bearing shell which, together with squeezing of the fluid as a contributing factor, account for excellent damping properties of the bearing 10.

The foil 16 may typically be of metal (or other suitable material) such as stainless spring-steel or copper beryllium 0.0005 to 0.005 in. (0.0125 to 0.125 mm), preferably 0.001 to 0.003 in. (0.025 to 0.075 mm) thick. As discussed in my previous U.S. Pat. No. 4,113,585, thickness may vary and the various portions 33, 34 and 36 may be plated or etched. For the wave portion 34, a typical wavelength may be 0.125 to 0.5 in. (3.125 to 12.5 mm) while a typical amplitude may be 0.005 to 0.010 in. (0.125 to 0.250 mm).

Figure 14:
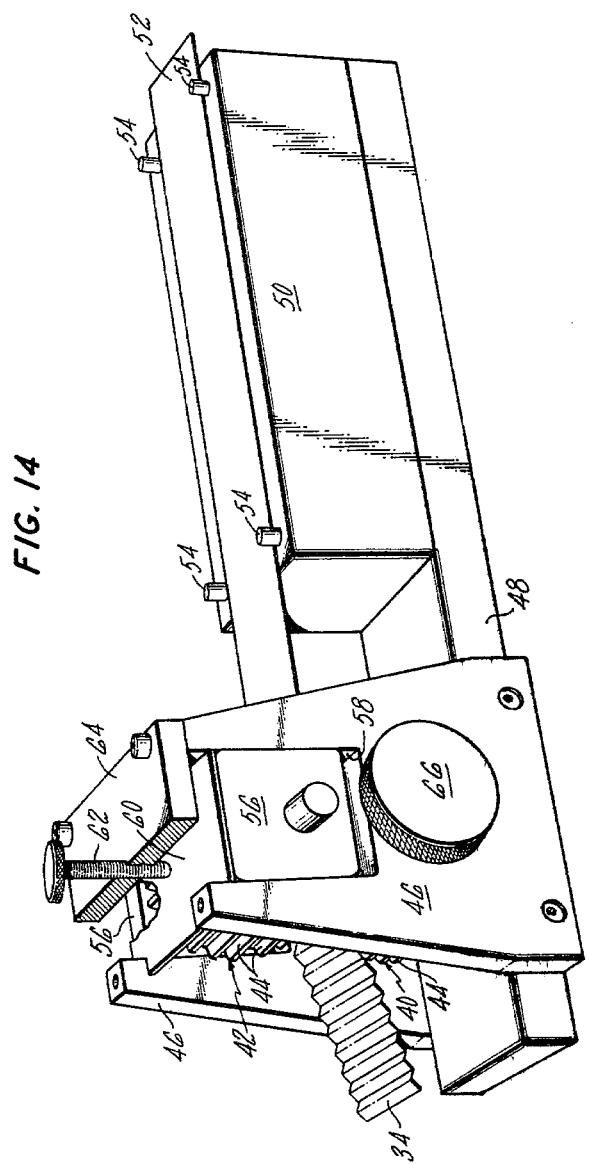
FIG. 14 is a perspective view of apparatus for forming the periodic wave portion of the foil.

Apparatus for corrugating foil is shown in FIG. 14. A pair of gears or corrugating rolls 40 and 42 having cooperating teeth 44 are mounted for rotation in standards or brackets 46 which are themselves secured to a base 48. A foil guide 50 in the form of a block is provided on the base 48 in order to support a foil blank 52 at the proper height for feeding between the corrugating rolls. Guide pins 54, which may be adjustable, are located on block 50 to keep the edges of the foil perpendicular to the corrugating rolls. The lower roll 40 preferably has a fixed axis of rotation while the upper roll 42 has a translatable axis of rotation by virtue of slidable bearing blocks 56 which are vertically movable in recesses 58 provided in the brackets 46. In order to bias the upper roll 42, a leaf spring 60 is mounted on the slides 56 and a centrally disposed adjusting screw 62, threaded through a plate 64 secured to brackets 46, engages the midpoint of the spring 60 to exert a desired amount of force thereon. The rolls may be conveniently driven by any suitable means such as hand wheel 66 mounted on the ends thereof, although for clarity of illustration, only one hand wheel 66 is shown. It will be appreciated that the teeth 44 of the rolls 40 and 42 need not be equal in size and their profile need not be standard. Involute gears, however, are easily cut and readily available and their contours can be modified with little difficulty, particularly the addenda. Various tooth shapes are depicted in FIGS. 15–18.

The wavelength of the corrugation is strongly dependent on gear pitch, but it is also influenced by the load on the leaf spring 60, which is the dominant factor in determining the amplitude of the undulations of the backing. The amplitude, and to a lesser extent the wavelength, are also influenced by the yield strength and flexural rigidity of the foil. Finally the local curvature of the deformed foil will be strongly influenced by the tooth profile, as well as by the yield strength and flexural rigidity of the foil.

Figure 15:
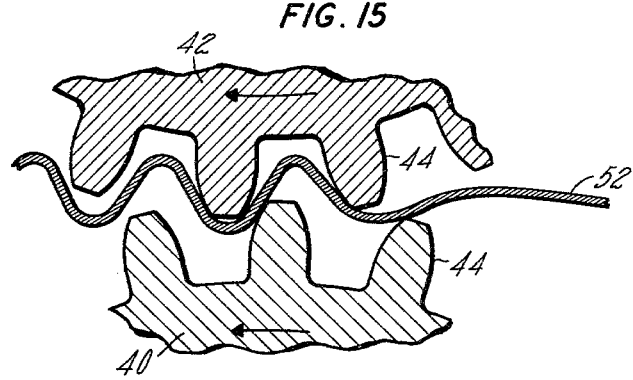
FIG. 15 is a broken sectional view of the gears as they form the periodic wave foil portion.
Figure 16:
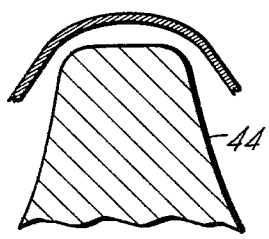
FIGS. 16-18 are sectional views of examples of tooth contours.
Figure 17:
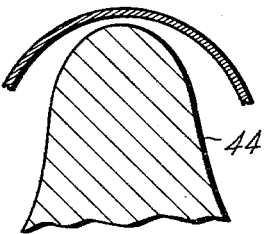
Figure 18:
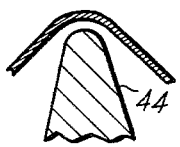

The deformation process is illustrated schematically in FIG. 15. The simultaneous transport and indentation is shown in that drawing while the effect of tooth profile is depicted qualitatively in FIGS. 16, 17 and 18. Since the outer foil-fibers of the foil 52 deform plastically, while the inner fibers do not exceed the elastic limit, considerable "spring-back" occurs from the fully deformed shape assumed by the foil between gear teeth. Two sharp corners of the addendum will produce finite curvatures in corresponding regions of the corrugation. On the other hand, because of the proximity of these corners, the nearly flat land between these corners will have a corresponding portion of the corrugation deformed to a definite curvature.

Using identical gears and foils, it is possible to change the peak-to-peak amplitude of a corrugation with slight changes in wavelength and local curvature as secondary effects, by simply varying the spring load on the gears. On the other hand, the same pair of gears can accommodate foils varying appreciably in thickness and properties of material.

Figure 19:
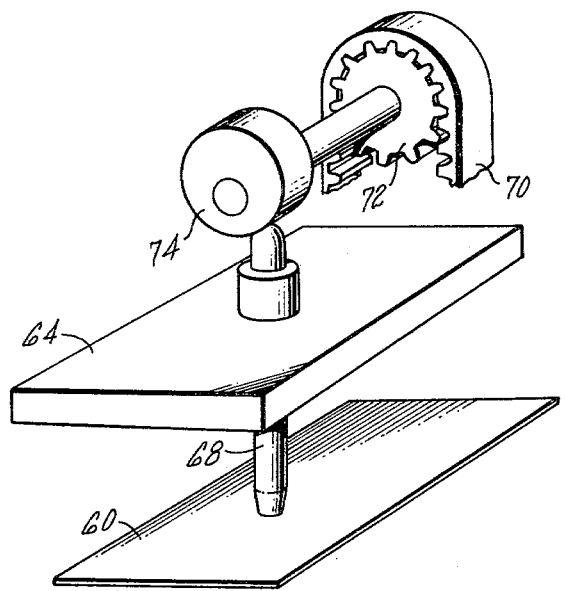
FIG. 19 is a perspective view of an alternate embodiment of apparatus for varying the gear loading to produce spring backings of variable amplitude.

In FIG. 19, there is shown a modification of a portion of the fabrication device of FIG. 14 which permits continuous variation of amplitude as suggested in FIG. 10. The FIG. 14 screw 62 loading the leaf spring is replaced by a reciprocable cam-actuated plunger 68 driven from the lower roll 40 by a belt 70 which drives a sprocket 72 and cam 74. The device can be easily adapted to mass production, with drive, spring loading and retraction of upper gear, and sequencing, as well as inspection.

In general, gears for producing useful corrugated foils, as for example those having a peak-to-peak amplitude of corrugations of the order of 0.005 to 0.010 in. (0.125 to 0.250 mm), typically "penetrate" but a small fraction of their tooth height. They do not actually "mesh" in the sense of a power-transmitting gear train, but they do engage and transport the foil. This penetration governs the amount of deformation (in a foil of given material and thickness) and, therefore, determines the wave amplitude. As indicated above, the shape of the tip of the tooth is very important, since, together with gear pitch and penetration, it governs curvature, i.e., the shape of the crests and troughs of the wave which, in turn, govern the compliance and damping of the foil element.

Figure 20:
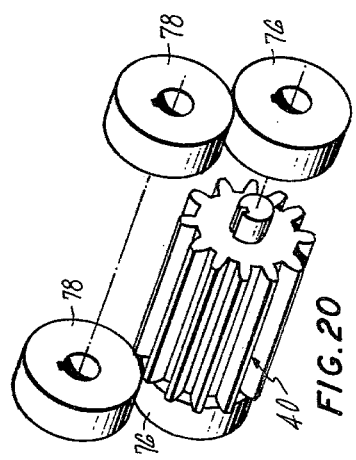
FIG. 20 is a partially exploded perspective view of a modification of the apparatus of FIG. 14.

Once a suitable waveform is established, it may be desirable to insure least variation of deformation in the transverse direction of the foil. Referring to FIG. 20, this may be accomplished through spacers 76 and 78 mounted concentrically on the ends of the gears 40 and 42. The spacers have a diameter smaller than the diameter defined by the tips of the teeth, so that the amount of penetration is prescribed and independent of the spring-force. Such spacers may be utilized not only in apparatus like that shown in FIG. 14 where one gear is translatable and spring loaded but also in apparatus where, during corrugation, neither gear is translatable.

As those skilled in the art will appreciate, the apparatus described herein allows for the fabrication of an almost infinite variety of wave forms by means of spring loaded pairs of gears of suitable pitch and tooth profile, using foils varying in thickness, width and material properties, in order to produce foil elements and bearings of desired stiffness and damping characteristics.

By way of summary, it can be seen that the present invention provides an improved fluid-film resilient journal bearing with many advantages. Some are:

(a) adjustable clearance, foil-retaining shell which permits an overall adjustment of bearing clearance and for variation of clearance along the journal axis;

(b) a plurality of coiled foil turns with resilient periodic wave backings, each backing integral with a plain section of coiled foil in which the ease of variation of wavelength, amplitude and local curvature of corrugations allows for deliberate control of stiffness and damping properties of the foil bearing;

(c) a method and device for accurate, inexpensive and continuous fabrication of corrugated foil elements by means of spring-loaded toothed gear wheels of appropriate pitch and tooth profile, wherein the same pair of gears, suitably preloaded, can produce the corrugations and foils of various thickness, width and material properties; and (d) a bearing, which effectively suppresses instabilities and limits resonant amplitudes of the rotor through inherent friction and fluid damping, which has flexibility to accommodate misalignment, inaccuracies of manufacture, thermal distortions, rotor unbalance and journal impact, and which is forgiving of particles by virtue of compliance, is endowed with superior wipe-wear characteristics and start-up cycling and during momentary high speed contacts, and is most suited for the support of high speed and high temperature turborotors.

What has been set forth above is intended primarily as exemplary to enable those skilled in the art in the practice of the invention and it should therefore be understood that, within the scope of the appended claims, the invention may be practiced in other ways than as specifically described.

I claim:

1. A hydrodynamic foil journal bearing comprising a stationary retaining member having a bore and a slit communicating with said bore;

a resilient foil insert assembly mounted on said retaining member in said bore and having a first bearing surface;

a rotatable journal disposed within said bore and having a second bearing surface cooperative with said first bearing surface to induce a fluid film therebetween; and means on said retaining member associated with said slit for varying the size of said bore to provide desired clearance and loading in said journal bearing.

2. The invention of claim 1 wherein said slit is disposed tangential to said bore.

3. The invention of claim 2 wherein said means is adapted to taper the height of said slit and hence taper said bore.

4. The invention of claim 3 wherein said means includes screw means for adjusting the size of said slit.

5. The invention of claim 4 wherein said foil insert assembly has an end disposed in said slit.

6. The invention of claim 5 including means on said retaining member for securing said end in said slit.

7. In a journal bearing comprising a stationary retaining member having a bore, a rotating journal having a bearing surface and, within said bore, a resilient foil-insert having a bearing surface wherein a fluid film is induced between said bearing surfaces, the improvement in said foil-insert which comprises a continuous length of foil coiled in more than one turn in said bore, said foil having a first, innermost portion thereof providing said foil-insert bearing surface and a second portion preceding said innermost portion and initially preformed to a corrugated shape to resiliently mount said first portion on said retaining member to ensure desired clearance and compliance in said journal bearing.

8. The invention of claim 7 wherein said second portion of said foil is contiguous to the bore of said retaining member.

9. The invention of claim 7 wherein said retaining member has a slit and one end of said foil is disposed in said slit.

10. The invention of claim 9 wherein said slit is disposed tangential to said bore.

11. The invention of claim 10 including means on said retaining member for adjusting the size of the slit to vary the clearance between said bearing surfaces.

12. The invention of claim 11 wherein said adjusting means is adapted to taper the height of said slit and hence taper said bore.

13. The invention of claim 12 including means on said retaining member for securing said one end of foil in said slit.

* * * * *